United States Patent

[11] 3,594,541

| [72] | Inventors | Eugene Francis Gorman<br>4 Drumlin Drive, Morris Plains, N.J. 07950;<br>John Kochis, 206 Allentown Road, Parsippany, N.J. 07054; George Kassotakis, 4 Woodcrest Court, South Weymouth, Mass. 02190 |
|------|-----------|---|
| [21] | Appl. No. | 1,890 |
| [22] | Filed | Jan. 9, 1970 |
| [45] | Patented | July 20, 1971<br>Continuation-in-part of application Ser. No. 787,120, Dec. 26, 1968. |

[54] AC SHIELDED ELECTRODE ARC WORKING
8 Claims, 3 Drawing Figs.

[52] U.S. Cl. ...................................... 219/137, 219/131 R
[51] Int. Cl. ...................................... B23k 9/00
[50] Field of Search ............................ 219/131, 135, 137; 315/244, 111

[56] References Cited
UNITED STATES PATENTS

| 1,146,988 | 7/1915 | Arendt | 219/131 |
|---|---|---|---|
| 2,085,242 | 6/1937 | Weaver | 315/277 |
| 2,130,077 | 9/1938 | Dorgelo | 315/207 |
| 2,472,323 | 6/1949 | Welch, Jr. | 315/244 X |
| 2,473,928 | 6/1949 | White | 219/131 X |
| 2,482,894 | 9/1949 | Bird | 315/244 X |
| 3,117,215 | 1/1964 | Ramsey | 219/131 |
| 3,335,306 | 10/1967 | Landis et al. | 219/131 X |

Primary Examiner—J. V. Truhe
Assistant Examiner—George A. Montanye
Attorneys—Paul A. Rose, Thomas I. O'Brien, Dominic J. Terminello and Eugene Lieberstein

ABSTRACT: A method of AC electrode shielded arc working wherein an RLC circuit is included in series with the AC supply source and the electrode for maintaining a continuous AC arc, the magnitudes of the components in the RLC circuit being correlated with the required reignition potential of the shielded atmosphere and the metal oxide surface of the workpiece.

PATENTED JUL 20 1971 3,594,541

INVENTORS
EUGENE F. GORMAN
GEORGE KASSOTAKIS
JOHN KOCHIS

BY *Eugene Lieberstein*
ATTORNEY

AC SHIELDED ELECTRODE ARC WORKING

This application is a continuation-in-part of U.S. application, Ser. No. 787,120 filed Dec. 26, 1968.

BACKGROUND OF THE INVENTION

This invention relates to gas shielded electrode arc working and more particularly to such welding with alternating current.

Welding with alternating current is particularly advantageous in applications requiring a cleaning action at the surface of the metal to be welded. Metals such as aluminum and magnesium and their alloys have this requirement. A refractory oxide film is readily formed upon the surface of such metals preventing fusion. During the half cycle of alternating current when the electrode is positive with respect to the work, electrons are caused to flow from the workpiece to the electrode dispersing the oxide layer and leaving a clean surface for the opposite half cycle of welding current. This, however, presupposes the existence of an arc for both half cycles. The arc extinguishes periodically at each instant of zero current. Ensuring arc reignition at the start of the reverse polarity half cycle, when the electrode is positive with respect to the work, requires an available voltage substantially higher than the open circuit voltage supplied from conventional welding power supplies. Welding power supplies are designed for safety reasons with a relatively low open circuit voltage. Hence, in alternating current welding reignition of the arc must be caused by auxiliary means. Heretofore, the arc was reignited on each alternate half cycle by superimposing high frequency or through voltage surge injection means. Voltage injection is costly and requires complex equipment while high frequency requires extensive shielding to prevent loss of power and troublesome radio interference and often does not provide positive and instantaneous reignition.

It is therefore the primary object of the present invention to provide a method for gas shielded electrode arc working with an alternating current power supply of relatively low open circuit voltage.

It is a further object of the present invention to maintain an alternating current arc established between an electrode and a workpiece in a shielded atmosphere by causing positive reignition of the arc at each instant of zero current by means of a low frequency series LC circuit wherein the magnitudes of inductance and capacitance are correlated with the required reignition potential of the gaseous atmosphere and the metal oxide surface.

Other objects and advantages will become apparent from the following detailed description of the invention in connection with the accompanying drawing in which.

Figure 1:
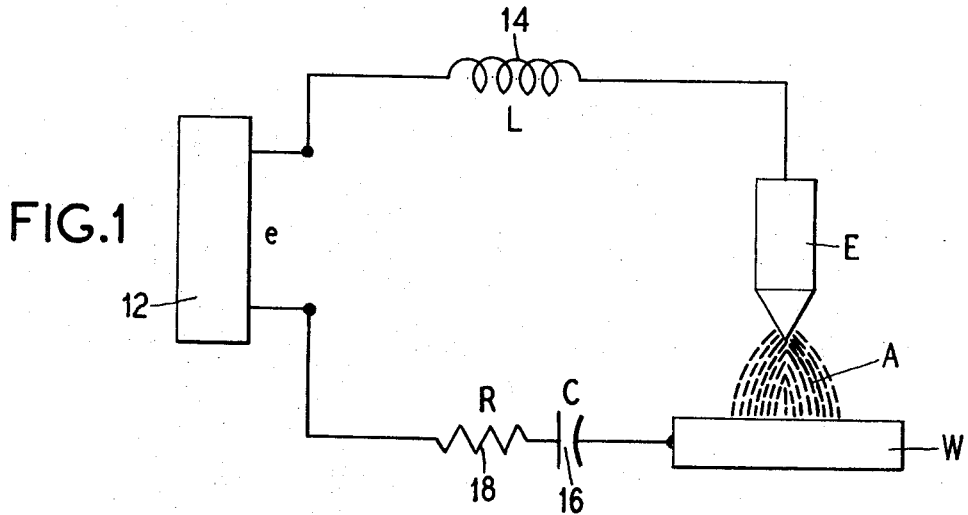
FIG. 1 is a schematic circuit diagram of the welding apparatus illustrative of the invention.

Referring now to FIG. 1, a nonconsumable electrode E, usually tungsten, is securely held within a torch at a predetermined distance above workpiece W. Electrode E and workpiece W are connected in a series circuit relationship with inductor 14, capacitor 16, resistor 18, and AC power source 12. AC power source 12 is a conventional AC supply which may represent in its simplest form a transformer having the primary thereof connected to an alternating current main power line. An arc A is initially established between the electrode E and workpiece W by any suitable means such as, for example, physically touching the electrode E to the workpiece W and then retracting it or by high frequency means. Shielding gas is passed down through the torch by means not shown to shield the electrode, arc, and weld puddle from atmospheric contamination.

As the arc current alternates in response to the input alternating voltage, the arc will extinguish itself at each instant of zero current. The shielding gas occupying the space between the tip of electrode E and workpiece W will remain conductive after the arc has extinguished for a brief period of time permitting reignition of the arc at voltage levels substantially lower than that which would be required in a nonconductive atmosphere. Similarly, the hot electrode tip and workpiece surface also permit lower reignition voltages provided the arc is immediately reignited before any cooling off occurs. The specific voltage required for reliable arc reignition differs for different metals and varies with surface condition, amperage, gas, electrode type and size, and electrode-to-work spacing. If a continuous pilot arc is used, the spacing is a less critical factor. The American Welding Society has stated in the Welding Handbook, 5th Edition, 1963, Section 2, Chapter 27 on pages 8—12 that "exhaustive tests have shown that during current reversals involving change from electrode negative to electrode positive about 150 or more volts rms are required for reliable arc reignition. Standard a-c welding machines usually have an open circuit voltage of about 70 to 80 v. (rms voltage). This voltage is sufficient for consistent arc establishment on straight polarity half cycles when the electrode is negative but is insufficient when the electrode is positive during the reverse polarity half cycles. The result is a very unstable, erratic arc, unless some method is used to impress a suitably high voltage into the welding circuit at the start of each reverse polarity half cycle. The impressed high voltage serves to reestablish an ionized path in the arc region and produce a stable arc condition." It is further stated in Chapter 29, page 10 of the same handbook that the National Electric Manufactures' Association (NEMA) standards require for safety that the open circuit voltage for manual welding does not exceed 80 volts and that the open circuit voltage for automatic and semiautomatic welding operations does not exceed 100 volts.

One proposal considered in U.S. Pat. No. 2,472,323 dated June 7, 1949 includes the use of a 2- to 10-volt battery or a condenser as a DC blocking element and as an auxiliary source of potential. It is taught therein that since a difference in electron emissivities exists between the straight and reverse polarity half cycles, a blocking capacitor or battery would prevent the production of a direct current component by imposing a means charge in the opposite direction and thus provide a "Balanced Wave." The establishment of a "Balanced Wave" is considered to be essential. It is also pointed out that the capacitor will charge to a DC voltage in response to the impressed input voltage and serve as an additional voltage source assisting the impressed input voltage in restriking the arc. The capacitor is used as the equivalent of a biased battery. Some inductance is added to achieve "partial" resonance. It should be noted, however, that in a truly resonant system the open circuit voltage is zero at the instant of zero current. Therefore, the open circuit voltage at zero current is unavailable to restrike the arc. The arc may restrike after sufficient time has elapsed for the impressed voltage to build up. At "partial" resonance a phase angle exists between the source voltage and current; thus the vector sum of the source voltage and the capacitor voltage will be present at the instant of zero current. Since the phase angle at "partial" resonance is inherently small, the actual instantaneous magnitude of voltage available for reignition will not differ substantially from that at resonance.

As stated hereinbefore, the shielding gas remains conductive for a brief period of time after the arc extinguishes permitting during this period the application of substantially lower voltages to cause arc reignition than would be required in a nonconductive atmosphere. To take advantage of the above, it is essential that an adequate arc reignition voltage be applied substantially at the instant of zero current. The loss of even a half cycle can require a larger voltage to support reignition than would be required at the first instant of zero current.

Moreover, the phase angle between the voltage and current is usually employed in conventional power supplies as a current control medium. The phase angle generally is varied between 60° to 80°. This is generally desired since the arc voltage is quite low requiring a high-reactive voltage drop in the welding power supply to limit welding current unless other current limiting means are employed. As such, a shift in phase should have little or no influence on arc reignition.

In accordance with the present invention it was discovered that the "Balanced Wave" criterion discussed in U.S. Pat. No. 2,472,323 is not only nonessential for AC stabilization but in some cases undesirable. The only essential consideration is the development of a sufficiently high voltage at instances of zero current. Contrary to what one might expect, the magnitude of the inductance 14 of FIG. 1 has proven to be of particular importance in developing a substantial reignition voltage. It has further been discovered that a predictable voltage of any desired magnitude can be developed at the precise instant of time the current passes through zero irrespective of the phase angle by setting the product of the peak value of alternating input current (for a sinusoidal input) and the inductive reactance in said LC circuit equal to the desired reignition voltage for the type of shielding medium employed.

Figure 2:
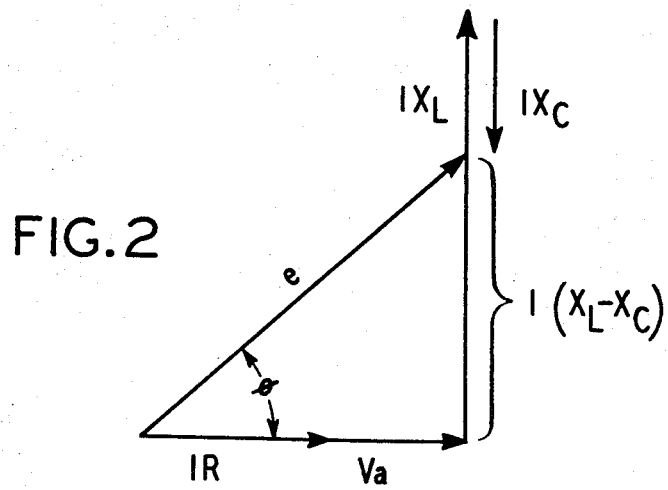
FIG. 2 is a vector diagram of the circuit voltages.

The importance of inductance can perhaps be explained qualitatively in terms of the energy interchange between the inductor and capacitor. The inductor acts as a source of energy absorbing energy during that part of the cycle when the current increases and releases its energy into the circuit when the current decreases. When the current is at zero, the capacitor has absorbed most of the energy released by the inductor and can in fact develop a voltage thereacross far in excess of the source voltage. Hence, the inductive reactance plays a significant role in determining the available capacitor voltage at the instant of zero current. In fact, by properly selecting the inductor instantaneous reignition may be ensured regardless of the magnitude of the open circuit voltage. Furthermore, as long as the magnitude of the inductance is chosen in accordance with the present invention, by setting the product of the inductive reactance and instantaneous peak current equal to the desired reignition voltage, the value chosen for the capacitor is relatively unimportant. However, it has been found that when the magnitude of the capacitor is small enough so that the capacitor completely discharges during each current cycle, it will always be ready to provide maximum support for arc reignition at each instant of zero current. Moreover, the magnitude of the capacitor directly affects the phase angle as is clearly apparent from FIG. 2 where one immediately realizes for a sinusoidal-type input source that:

(1) $e \sin\theta = I(X_L - X_c)$ and that (2)

$e \cos\theta = IR + Va$ where $e$ = input voltage (RMS or instantaneous peak)
$\theta$ = phase angle
$I$ = current (RMS or instantaneous peak)
$R$ = resistance
$Va$ = arc voltage
$f$ = frequency in cycles per second
$X_L$ = inductive reactance = $2\pi f L$
$L$ = inductance in henries
$X_c$ = capacitive reactance = $1/2\pi f C$
$C$ = capacitance in farads Thus, the magnitude of the capacitor can be arbitrarily selected for any phase angle or the capacitance directly calculated from equation (1) for a particular phase angle. Another alternative would be to add a second variable inductor in series with a fixed minimum inductance and capacitance to support instantaneous reignition. The variable inductor would then provide current and phase angle control as well as transfer some additional restriking energy to the capacitor.

Resistor 18 has not been mentioned hereinbefore since the voltage thereacross at instances of zero current is zero and accordingly, has no effect on the reignition voltage. However, as is apparent from equation (2), the amount of resistance can affect other variables such as phase angle, and current. Even if the resistor 18 were reduced to zero, there would still be some internal resistance in the circuit which would have a limiting effect on the current flow even at zero phase angle. Although the addition of a resistor of a predetermined low value is preferred under certain circumstances, its inclusion is not essential for practicing the invention. In accordance with equation (2) current may be changed by varying $\theta$ or by varying the resistor R. The phase angle $\theta$ may be varied by varying the magnitude of the capacitance or inductance. Less expensive power supplies use a variable resistor for current control.

Table I below sets forth the required values of components 14, 16, and 18 for different phase angles. The values were determined using the specification given below by first setting the product of the inductive reactance and peak current equal to the desired reignition voltage:

$e$ = Input (open circuit) voltage = 70 volts (RMS)
$I$ = welding current = 100 amps (RMS)
$V_{AR}$ = desired instantaneous reignition potential = 200 volts = $I_m X_L$
$I_m$ = instantaneous peak current = 100/0.707
$f$ = freq. = 60 cycles per second
$V_A$ = arc voltage = 40 volts (RMS)

TABLE I

| $\theta$ | L(mh.) | C($\mu$f.) | R (ohms) | I²R (watts) |
|---|---|---|---|---|
| +45 | 3.74 | 2880 | 0.095 | 950 |
| +25 | 3.74 | 2380 | 0.234 | 2340 |
| 0 (resonance) | 3.74 | 1880 | 0.3 | 3000 |
| −25 | 3.74 | 1550 | 0.234 | 2340 |
| −45 | 3.74 | 1390 | 0.095 | 950 |

It should be observed that the reignition potential is constant at any phase angle. The phase angle was varied by changing the magnitude of the capacitor. The resistance also had to be adjusted slightly to maintain the current and arc voltage constant. It should be apparent that both L and C could both be fixed and R varied for current control. In this case the inductor would be chosen to provide an appropriate reignition voltage at the lowest desired operating current. The capacitor would then be selected for a particular $\theta$.

Table II shown below illustrates typical component values for a fixed resistor power supply with varying capacitance at different arc voltage settings using the following circuit requirements:

$e$ = input (open circuit) voltage = 70 volts (RMS)
$I$ = welding current = 100 amps (RMS)
$Va$ = arc voltage
$V_{AR}$ = design instantaneous reignition potential = 200 volts
$f$ = freq. = 60 cycles
$R$ = resistance = 0.05 ohms
$\theta$ = phase angle The table illustrates representative design values for a 100-ampere maximum power supply at the design maximum.

TABLE II

| Va | $\theta$ | L (mh.) | C ($\mu$f.) | $I_m X_L$ (volts) | $I_m X_c$ (volts) | $e_m \sin\theta$ (volts) |
|---|---|---|---|---|---|---|
| 10 | 77.6 | 3.74 | 3,630 | 200 | 103 | 97 |
| 20 | 69 | 3.74 | 3,480 | 200 | 107 | 93 |
| 40 | 50 | 3.74 | 3,000 | 200 | 124 | 76 |

In general, the present invention teaches how to achieve a desired reignition potential at the instant of zero current irrespective of the phase angle. Hence, if one knows the minimum current that would be employed in a particular application, the inductive reactance can be fixed by dividing the minimum reignition potential necessary for the particular shielding gas employed by the minimum current. This will yield the minimum necessary inductance for the power supply. The power supply may be of any type, i.e., variable inductor, capacitor or resistor or a combination. Where argon is employed as the shielding gas the minimum suitable product for the inductive reactance and peak instantaneous current has been found to be at least 100 volts although 150 volts is preferred. For helium the product of the inductive reactance and current should be at least 125 volts but preferably 175 volts. Therefore, in the case of argon for example, where the current is 80 amperes and the frequency 60 cycles per second a minimum inductance of about 4 mh. would be satisfactory. However, for low-current work particularly wherein the arc is constricted in a nozzle conventionally referred to as "needle arc" unusually high inductances are required. For example, in an argon atmosphere with 3 amperes welding current an inductor of about 75 mh. would be necessary to achieve instantaneous reignition in accordance with the principles of this invention. The preferred magnitude of the series capacitor has been found to perform most satisfactorily within the range of no more than 60 microfarads per ampere of welding current.

Figure 3:
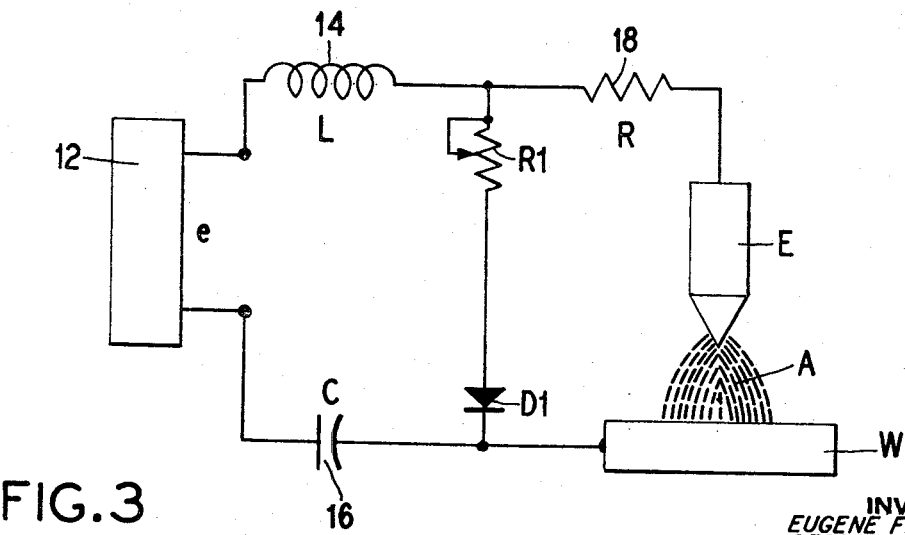
FIG. 3 is a modified circuit diagram of the welding apparatus of FIG. 1.

As hereinbefore noted, it is common practice in the art to add a series capacitor to the welding circuit to produce a balanced wave AC current flow. Balanced wave is not, however, necessary and is, in fact, in some instances undesirable since during the reverse polarity half cycle the electrode tends to overheat. We have also found that in welding different joint types, one example being edge welds, less of the reverse polarity cycle is desired than, for example, in the case of butt welds. The system of the present invention may be controllably unbalanced by modifying the circuit of FIG. 1 as shown in FIG. 3. The only difference between the two circuits is in the addition of a bypass diode D1 and a variable resistor R1, the series combination being placed in parallel with the arc. During the reverse polarity half cycle current is diverted through the diode resistor combination as determined by the setting of variable resistor R1. The straight polarity half cycle is unaffected. Capacitor C and inductor L act in the same manner as discussed heretofore with respect to FIG. 1 reigniting the arc at the instant of zero current.

As an added safety feature, should the arc be deliberately shutoff for any reason during the welding operation, a bleed resistor may be placed in parallel with condenser C to remove any residual charge. In general, the bleed resistor should be selected such that the relationship of R×C is less than 10 seconds, preferably about 2 seconds. Obviously, this will not effect the circuit operation of FIGS. 1 or 3.

Although the invention has been described with reference to a nonconsumable electrode arc working process, it is clearly evident that the specific process involved is not a limiting factor. The invention is concerned only with establishing a sufficient voltage at the crossover between half cycles of the AC input to ensure the instantaneous reinstatement of current flow for each of the AC input half cycles respectively, irrespective of the phase angle between the voltage and current. Therefore, the invention is applicable to any arc working process where AC input power is to be applied such as for example AC consumable electrode metal inert gas arc welding known to the art as "MIG" welding, arc cutting, and metal working. Other applicable welding processes include shielded metal arc (coated electrode), submerged arc welding, and plasma arc welding. Nor is the invention limited to aluminum and its alloys or to any particular shielding medium.

Furthermore, the invention is not limited to any particular AC input wave shape. However, for a nonsinusoidal input such as for example a square wave or series of pulses the calculation of inductance is more complicated. The work "peak" used hereinbefore throughout the specification relates to a sinusoidal input losing its conventionally accepted meaning when applied to more complex wave shapes. Hence, for any wave shape regardless of complexity the minimum necessary inductive reactance can be determined by dividing the minimum reignition potential required for the particular shielding medium employed by the rate of change of current with time as the instant current reaches zero (for a sine wave this reduces to peak current). The capacitor may then be calculated for an appropriate phase angle from the following equation:

$$V_{AR} = L = \frac{di}{dt} e - \frac{1}{c} \int^{idt}_{\text{Limit as } i \to 0}$$

where;
$i$ = instantaneous value of circuit current
$e$ = impressed or source voltage
$V_{AR}$ = required arc reignition voltage
$L$ = inductance in henries
$c$ = capacitance in farads
$w = 2\pi f$
$t$ = any instant of time
$\theta$ = phase angle = $2\pi$ ft.

To solve the above equation wave shape expressions for $i$ and $e$ must be substituted.

We claim:
1. In a method of AC arc working wherein an alternating current arc is established between an electrode and a workpiece, said electrode and workpiece being connected in series circuit relationship with a series coupled inductor and capacitor and an AC source of potential, said AC source of potential having an open circuit voltage substantially below the reignition voltage necessary to sustain conduction between said electrode and said workpiece at instances of zero current in the circuit; the improvement which comprises: imposing a voltage between said electrode and said workpiece at each instant of zero current in the circuit at least equal to the value obtained by setting the product of the circuit inductance and the rate of change of circuit current with time at each instant that the current in the circuit reaches zero equal to said reignition voltage for sustaining conduction between said electrode and workpiece such that said alternating current arc is instantaneously reestablished at each of said zero current instances irrespective of the phase angle between the AC source of potential and circuit current and irrespective of the magnitude of said alternating source of potential at such instances of time.

2. In a method of AC arc working wherein an alternating current arc is established between an electrode and a workpiece, said electrode and workpiece being connected in series circuit relationship with a series LC circuit and a sinusoidal AC source of potential, said AC source of potential having an open circuit voltage substantially below the reignition voltage necessary to sustain conduction between said electrode and said workpiece at instances of zero current in the circuit; the improvement which comprises: imposing a voltage between said electrode and said workpiece at the instant of zero current in the circuit at least equal to the value obtained by setting the product of the peak magnitude of alternating input current and the inductive reactance in said LC circuit equal to said reignition voltage for sustaining conduction between said electrode and said workpiece such that said alternating current arc is instantaneously reestablished at each of said zero current instances irrespective of the phase angle between the AC source of potential and circuit current and irrespective of the magnitude of said alternating source of potential at such instances of time.

3. A method of AC arc working as defined in claim 2 wherein the series capacitor of said LC circuit has a magnitude of no more than 60 microfarads per ampere of welding current.

4. A method of AC arc working as defined in claim 3 wherein the minimum magnitude of said inductive reactance is at least equal to 100 volts divided by the minimum peak value of alternating input current for an argon gas shielded atmosphere.

5. A method of AC arc working as defined in claim 3 wherein the minimum magnitude of said inductive reactance is at least equal to 125 volts divided by the minimum peak value of alternating input current for a shielded atmosphere of gas selected from the class consisting of helium and helium-argon combinations.

6. A method of AC arc working as defined in claim 2 wherein a resistor is connected in series with said inductor and capacitor.

7. A method of AC arc working as defined in claim 6 wherein the magnitude of said current is controlled by varying the resistance.

8. A method of AC arc working as defined in claim 2 wherein a series combination of a variable resistor and a bypass diode is connected in parallel directly across the arc such that during the reverse polarity half cycle a predetermined amount of current is diverted through the series resistor and diode combination.